United States Patent
Munsterhuis et al.

(10) Patent No.: US 7,076,373 B1
(45) Date of Patent: Jul. 11, 2006

(54) LEAK DETECTION SYSTEM FOR A WATER HEATER

(75) Inventors: Sybrandus B. V. Munsterhuis, Dalen (NL); Chian Brent, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/036,261

(22) Filed: Jan. 14, 2005

(51) Int. Cl.
*G01F 23/00* (2006.01)
*G01L 7/00* (2006.01)

(52) U.S. Cl. .................................................. 702/51
(58) Field of Classification Search .................. 702/51
See application file for complete search history.

(56) References Cited

U.S. PATENT DOCUMENTS

| | | | | |
|---|---|---|---|---|
| 4,133,373 A | * | 1/1979 | Slagley et al. | 165/11.1 |
| 5,353,653 A | * | 10/1994 | Watanabe et al. | 73/865.9 |
| 6,135,133 A | * | 10/2000 | Ridgeway, Jr. | 137/15.11 |
| 6,611,133 B1 | * | 8/2003 | Kean et al. | 324/71.1 |
| 2005/0040251 A1 | * | 2/2005 | Daly | 237/81 |

* cited by examiner

*Primary Examiner*—John Barlow
*Assistant Examiner*—Demetrius R. Pretlow
(74) *Attorney, Agent, or Firm*—Gregory M. Ansems

(57) ABSTRACT

A method for determining the presence of a leak in a water heater unit comprising a storage tank is presented. The present invention involves mounting one heating sensor on the lower half of the tank and another heating sensor on the upper half of the tank. Readings from both sensors are taken and compared to determine if the water heater tank has reached a steady state; if so, the cooling rate of the tank is determined. This cooling rate is compared to the historical natural cooling rate of the system, and based on the comparison a determination is made on the presence of a leak.

26 Claims, 7 Drawing Sheets

US 7,076,373 B1

LEAK DETECTION SYSTEM FOR A WATER HEATER

FIELD

The present invention relates to the field of water leak detection systems. More specifically, the present invention relates to a water leak detection system for water heating units with storage tanks.

BACKGROUND

Storage water heater units provide hot water to commercial and household facilities by heating stored water in a tank by electric elements or by a gas burner. After a unit ceases to function, the cause of failure is typically determined to be a water leak or similar fault. Such leaks often begin small, and if left unattended can develop into serious leaks that result in extensive water damage to the surrounding environment as well as to the appliance itself. Because of such a propensity for this type of failure and the high costs that are associated with it, there has been a substantial effort to enable the owner of a water heater unit to quickly determine the presence of a relatively small leak before it has developed into a serious problem.

Leak detection of water storage tanks has generally been accomplished through the use of moisture sensors located on or around the perimeter of the water storage tank. These sensors are activated in the presence of wet environments and can come in several different forms. However, depending on the number of sensors used and their location, a leak may go unnoticed for a substantial length of time as to result in permanent property damage. The moisture sensors may require a substantial accumulation of standing water in order to be triggered, meaning that a large amount of costly water damage can be incurred before a leak is first detected and action is taken to mitigate the problem. In addition, water storage tanks may be placed in a variety of environments where moisture sensors may be incompatible since optimal placement of the sensors may not be possible.

After a leak has been detected, varying degrees of response are offered by current leak detection systems. The simplest systems offer a passive response, whereby the system only provides an indicator (usually an audible or visible alarm) that a possible leak has been detected. Unfortunately, the leak indicators included on passive devices are generally local to the site of the water storage tank and do not allow for remote diagnostics. These systems are generally cheaper to purchase and install, although they offer a relatively small measure of protection against leaks and fairly limited notification utility. More advanced systems offer an active response, allowing for immediate action to automatically be taken when a leak is first detected. These active systems are connected to water line valves which can be closed in order to prevent additional water from entering the leaking portion of the system. However, active leak detection systems are more costly than their passive counterparts and require special hardware to install onto existing water system infrastructure.

It would be desirable to have a water leak detection system for a water heater unit storage tank that has a high sensitivity for detecting relatively small leaks, allowing a leak to be detected during its formative stages. In addition, the leak detection system should be compatible with both active and passive response equipment. Finally, the system should be amenable to a variety of water heater unit environments and be able to adapt to a variety of water heater unit designs and conditions. Preferably, the leak detection system should generally depend on characteristics of the water heater unit itself, and be able to take into account changes in these characteristics over the life of the water heater unit.

BRIEF DESCRIPTION OF THE DRAWINGS

Exemplary embodiments of the invention are described below in conjunction with the appended figures, wherein like reference numerals refer to like elements in the various figures, and wherein.

DETAILED DESCRIPTION OF THE INVENTION

1. Exemplary Hardware

Figure 2:
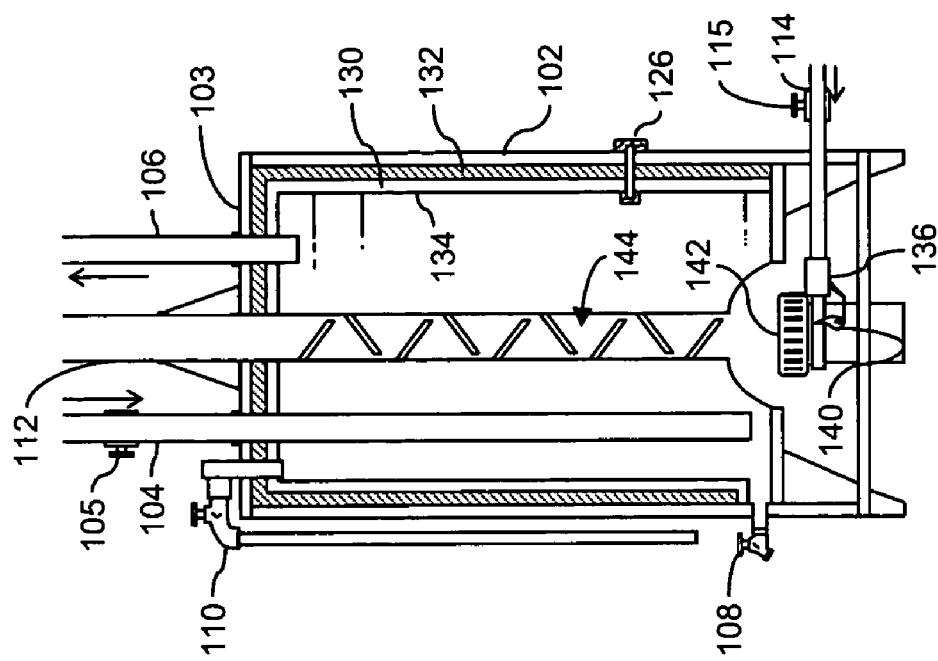
FIG. 2 is a cutaway view of a water heater with an integrated leak detection system using a temperature sensor.
Figure 1:
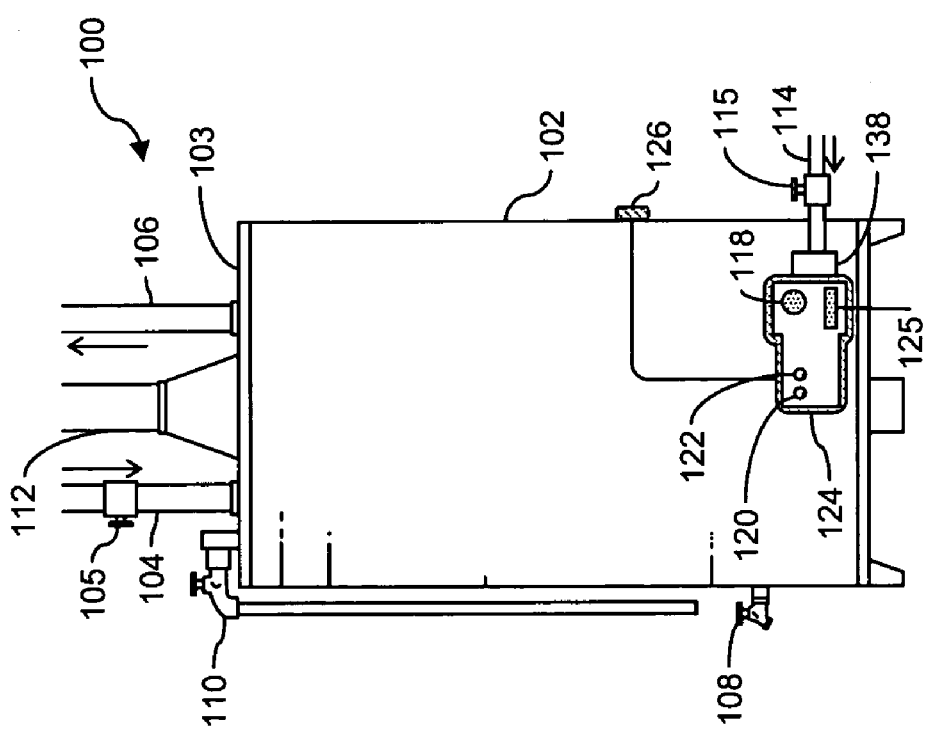
FIG. 1 is a frontal view of a water heater with an integrated leak detection system using a temperature sensor.
Figure 4:
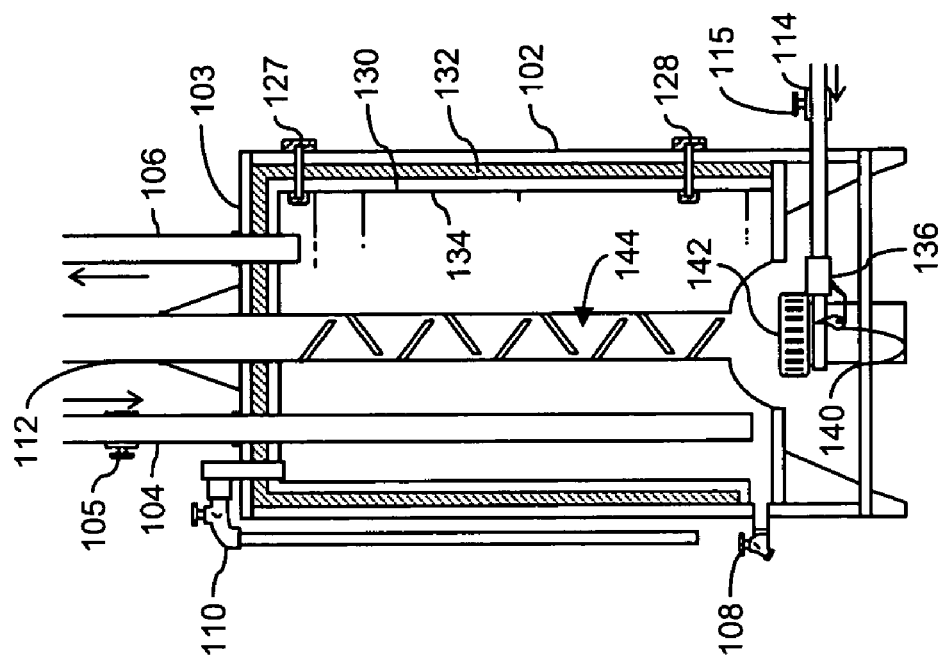
FIG. 4 is a cutaway view of a water heater with an integrated leak detection system using two temperatures sensors.
Figure 3:
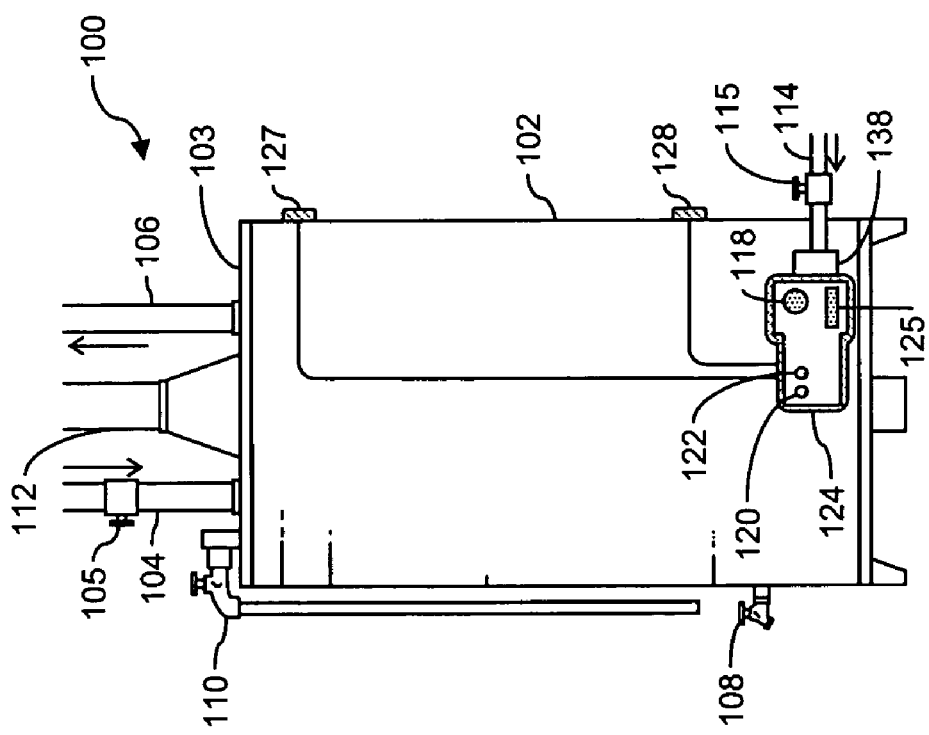
FIG. 3 is a frontal view of a water heater with an integrated leak detection system using two temperature sensors.

FIG. 1 is a frontal view and FIG. 2 is a cutaway view of a water heater unit 100 of one embodiment that contains one water temperature sensor 126. Similarly, FIG. 3 is a frontal view and FIG. 4 is a cutaway view of a water heater unit 100 of another embodiment of the present invention that contains two water temperature sensors 127, 128. The bulk of the water heater is surrounded by a water heater unit shield 102 that houses the internal components of the water heater unit and protects them from the environment. A storage tank 130 makes up a bulk of the internal components of the unit and contains water that is to be heated. The tank may be constructed of plain or stainless steel, or another heat conducting material. A layer of insulation 132 may be placed between the shield 102 and the storage tank 130 to prevent hot water stored in the tank 130 from losing heat to the surrounding environment. Additionally, the storage tank 130 may include a bonded-glass interior liner 134 to prevent the formation of rust on the tank surface.

An inlet pipe 104 and outlet pipe 106 extend through the upper surface 103 of the water heater unit 100 and pass through the shield 102 and insulation 132, and allow access to the storage tank 130. These pipes may be made of copper or other suitable material, and the outlet pipe may be wrapped in insulating material to prevent heat loss during transfer of the water. Additionally, the inlet pipe 104 may contain an intake valve 105 to control the supply of incoming water to the tank.

The inlet pipe 104 extends from the upper surface of the tank to a predetermined distance from the bottom. This predetermined distance is generally fairly close to the bottom, and allows supply water to enter the tank close to the heated bottom of the tank. The outlet pipe 106 extends from the upper surface of the tank to a second predetermined distance from the top. This second predetermined distance is generally fairly close to the top surface of the tank. This arrangement of the inlet pipe 104 and outlet pipe 106 utilizes the concept of "heat rises" and permits cool intake water to enter the tank at the bottom, while the heated water rises to the top of the tank, where it is output on demand.

Routine maintenance on water heater units generally includes draining portions of the water stored in the unit to prevent sediment from collecting in the storage tank 130. As a result, a drain spigot 108 may be located near the bottom section of the water heater unit 100 and can be used to drain water and waste from the storage tank 130. Additionally, a temperature pressure release (TPR) valve 110 may be located near the top of the unit. Because of the expansion of heated liquids and gases, certain conditions can result in dangerous pressure levels within the storage tank 130. The TPR valve 110 allows for over-pressure gases and fluids to escape harmlessly, thereby preventing a rupture or explosion of the storage tank.

The water heater unit 100 of FIGS. 1, 2, 3, and 4 is a gas water heater system and includes a gas supply pipe 114 that provides a steady supply of fuel for heating purposes. The gas pipe 114 may include a redundant safety valve 115 to terminate the flow of fuel from the external source, in order to allow for maintenance on or safe removal of the unit. The rate of flow of gas entering the heating system is further controlled through a valve assembly 138, which may also be used to bring the pressure of the gas to an acceptable level for the main burner 142. This valve assembly 138 may contain a pilot valve, a main valve, a pilot regulator, and a main regulator. The valves in the valve assembly 138 may be solenoid-controlled valves, linear actuated valves, motor actuated valves or any other valve capable of controlling the flow and pressure of gas provided to the main burner 142 and pilot assembly 136.

A pilot assembly 136 may be located downstream of the valve assembly 138 and can provide for ignition and detection of a pilot 140. In some models, the pilot assembly connection may be incorporated into the valve assembly 138. Alternatively, newer and more efficient gas unit models may lack pilot support entirely and may simply provide a standalone ignition device for the main burner 142.

Located in the lower section of the water heater unit, the main burner 142 is the central heating element of the gas water heating system. When gas is available through the gas valve assembly 138, the burner unit 142 mixes the fuel with available oxygen from the air. The combustible mixture is then ignited through either a pilot 140 or a direct ignition source, and produces heat. This heat is transferred to the tank which in turn heats the water stored inside. The heated gases produced by the combustion are vented through an exhaust pipe 112. A complex array of baffles 144 is generally included in the exhaust pipe 112 in order to maximize the transfer of heat from the exhaust gases to the storage tank 130.

In an alternative embodiment (not shown) the water heater unit may utilize electric as opposed to gas heating elements. In this system the gas line 114 and related hardware are replaced by one or more resistive heaters that reside within the storage tank 130 and loop through the water. The electric heating elements consist of an electrically resistive material that transforms electric potential into heat. The amount of heat generated by each resistive loop can be controlled by the amount of electric potential, or voltage, applied: increasing the voltage increases the current flowing through the element and results in increased heating, while little or no heat may be produced if the voltage is reduced or turned off, respectively.

For the gas water heater systems shown in FIGS. 1, 2, 3, and 4 the gas valve assembly 138 and related ignition sources may be automatically monitored and adjusted by a control unit 124. Housed inside the control unit 124 is a processor (not shown) that monitors various conditions of the tank and calculates several control signals for the burner 142, gas valve assembly 138, and pilot assembly 136. In the case of an electric water heater control system, the processor calculates control signals for the resistive heating elements located in the tank. In conjunction with a memory unit (not shown) for storing instructions and relevant data values, the processor may also be used to compute other values that may be used by the system in order to detect the presence of a leak. For example, the processor may take inputs from temperature sensors and stored data regarding cooling rates in order to determine if the system has potentially developed a leak.

The controller 124 may also have a control knob 118 to power the water heater on and off, and which may also be used to manually adjust the temperature settings of the water heater unit. Additionally, the control unit 124 may contain a heater indicator 122 to alert the user of the status of the heating elements, specifically showing whether the heating system is active or turned off. The indicator may be an LED or other device that can visually indicate the status of the heating elements 142.

A second indicator may be present to alert a user of the presence of leak within the unit. This leak indicator 120 may be an LED or other visual device located on the control unit 124. Alternatively, the leak indicator 120 may be located externally in a more visually accessible area than the location of the water heater unit; for example, if the water heater is located in the basement of a residential household, the leak indicator may be located on a main floor near an existing thermostat control. In addition to a visual alarm, the leak indicator 120 may also include an audible alarm device to aurally signify the presence of a leak and may also be used to determine the presence of the leak.

For the system of FIGS. 1 and 2, a temperature sensor 126 may be connected to the control unit 124 to provide heating data to the processor. The data provided by the sensor 126 may generally be used to determine the need for additional heat from the heating element. However, this sensor 126 may also be used to detect when the system has reached a steady state, where the water throughout the tank is at a nearly universal temperature. Additionally, the change in the water temperature measured by the sensor 126 may be used by the control unit 124 to determine a cooling rate, which can be useful in determining a possible leak, as further described below. Generally, the temperature sensor 126 may be located on the bottom half of the storage tank 102. This allows the system to better detect the need for additional heat in the case of a water draw, where cooler intake water generally enters at the bottom of the tank.

In an alternative embodiment, shown in FIG. 3 and FIG. 4, two temperature sensors 127, 128 may be utilized to provide additional sensitivity in determining the state of water of in the water storage tank 102. The two water temperature sensors 127, 128 may be situated anywhere along the water tank 102, although ideally the sensors should be positioned far enough away from each other as to avoid redundancy in their measurements. Additionally, the sensors 127, 128 generally should be located at different heights of the water tank, so as to obtain a better reading of the overall temperature of the water tank 102 given that the water temperature in the water tank 102 may vary according to vertical depth. In FIG. 3 and FIG. 4, an upper sensor 127 and a lower sensor 128 are shown connected to the control unit. Together these two sensors may provide data concerning the temperature at two different levels in the tank, where the lower sensor 128 measures the temperature of the stored water near the cool water intake and the upper sensor 126 measures the heated water stored near the top of the tank. These two sensors also allow for a temperature differential between the upper and lower portions of the water tank 102 to be monitored by the control unit 124.

Ambient temperature information may be provided to the processor through an external thermal sensor 125. By measuring the temperature of the system environment, it is possible to perform more advanced calculations concerning heat and energy management. This data, along with water tank temperature and calculated cooling rates, may also be used to help detect an increase in the loss of heat to the environment, an indication of a possible hot water leak.

2. Cooling Rate Equations

In a typical storage water heating system the water in the storage tank 130 undergoes heating and cooling cycles consisting of a rapid heating period followed by a relatively slow cooling phase. These cycles are determined by the active and inactive periods, respectively, of the heating element, which is managed by the control unit 124. Utilizing data from the various control temperature sensors, the control unit 124 determines if the water temperature has fallen below a lower threshold; if so, the control unit 124 activates the heating element 142 and begins heating the water in the tank. The control unit 124 continues to monitor the rise in the water temperature using the temperature sensors, and once an upper threshold temperature has been reached the heating element is turned off.

Once the heating element 142 is turned off, water begins to lose heat to the surrounding environment. The rate at which this loss occurs can be called the natural cooling rate of the system. This cooling rate depends on several properties of both the system and its environment, including the size of the water tank 130, the amount of insulation 132, the temperature rise provided by the pilot 140, the current temperature of the water, and the ambient temperature. Some of these variables can be measured directly, such as the ambient and water temperatures. However, the effects of the size of the water tank 130, the amount of insulation 132, the pilot 140 temperature rise, and other immeasurable variables must be indirectly calculated or approximated.

Figure 5:
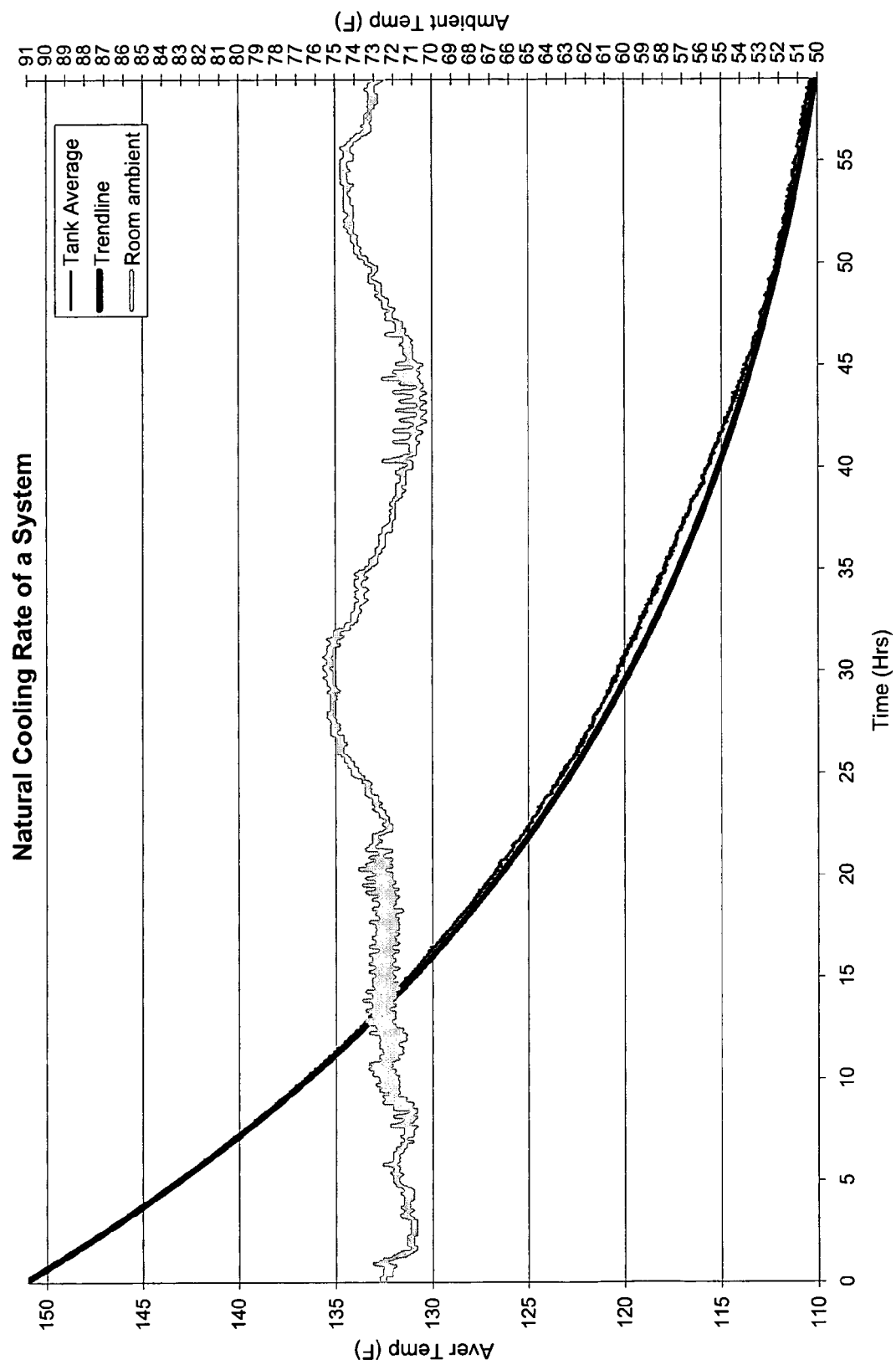
FIG. 5 is a chart of experimental data showing the natural cooling trend over time for a gas water heater system.

FIG. 5 shows the natural cooling behavior of a 40 gallon storage gas water heater tank as it cools from approximately 151° F. to approximately 110° F. Utilizing the data from this and related experiments, it has been found that the temperature of the water in the tank follows a natural decay and can be approximated using the following temperature equation:

$$T_m(t) = T_a + T_p + [T_m(t_0) - T_a - T_p] \cdot e^{\frac{-t}{\tau}} \quad (1)$$

where $T_m$ is the average temperature of the storage tank, $T_a$ is the ambient temperature, $T_p$ is the temperature rise caused by the heating pilot, $\tau$ is the steady-state cooling time constant, $t_0$ is the initial time where the water has reached it's maximum heated temperature, and t is the time elapsed since $t_0$. The steady-state cooling time constant incorporates the unmeasurable effects of the tank insulation, size, and related thermal properties. The pilot temperature rise is the temperature difference over the ambient temperature caused by the pilot, and for a typical 40 G tank with one-inch insulation and 370 BTU pilot, it may be about 35 to about 40° F. Both the cooling time constant and the pilot temperature rise are nearly constant over the lifetime of the system; however, small, gradual, or seasonal variations in these values can be compensated by a slow adjustment of the historical cooling rate. The ambient temperature may be measured and updated continuously. The cooling time constant may be about 25 to about 28 hours for a 40 G tank, and may be "learned" during the early life of the water heater. The ambient temperature plus the temperature rise of the heating pilot can be called the base temperature, and is the final steady-state temperature of the system when the main burner is inactive. Because electric water heating systems do not utilize a pilot 140, the temperature rise by the pilot is inapplicable and can be replaced with zero; subsequently, the base temperature of the system for an electric water heating system is simply the ambient temperature.

The actual cooling rate of the system is derived from the above temperature equation, and is simply the change in temperature of the system with respect to the time value t. As a function of time, the cooling rate can then be represented by the following equation:

$$C(t) = -\left[\frac{T_m(t_0) - T_a - T_p}{\tau}\right] \cdot e^{\frac{-t}{\tau}} \quad (2)$$

where $T_m - T_a - T_p$ is the base temperature differential and C is the natural cooling rate of the system at a given base temperature differential. Like the temperature of the system, the cooling rate also experiences a natural decay over time as determined by the cooling time constant.

The natural cooling rate of the system can also be calculated for any given moment of time as a function of the current conditions of the tank. Utilizing experimental data, as displayed in FIG. 6, it can be shown that the natural cooling rate experiences a linear decay with respect to the change in temperature. Using the heat dissipation characteristics of the tank, along with current temperature readings, the natural cooling rate at any given time can be approximated using the equation:

$$C(t_n) = \frac{T_m(t_n) - T_a - T_p}{\tau} \quad (3)$$

where $t_n$ is a specific moment in time. Using equation 3, it is no longer necessary to consider time as a component in determining the natural cooling rate. This simplifies the calculation of the rate and allows cooling rates at similar measured temperatures to be directly compared. Additionally, due to the linearity of the cooling rate function (3) it is possible to compare cooling rates measured at different temperatures by performing a relatively simple normalization function on one of the measured values. For example, a first cooling rate reading that is taken at 20° F. over the base temperature may be compared to a second reading taken at 30° F. over the base temperature by multiplying the first reading by 30/20. Likewise, the second reading may be compared to the first by multiplying the second reading by 20/30. Generally, accurate readings for cooling rates occur when the temperature of the water is 20° F. or more over the base temperature.

Figure 6:
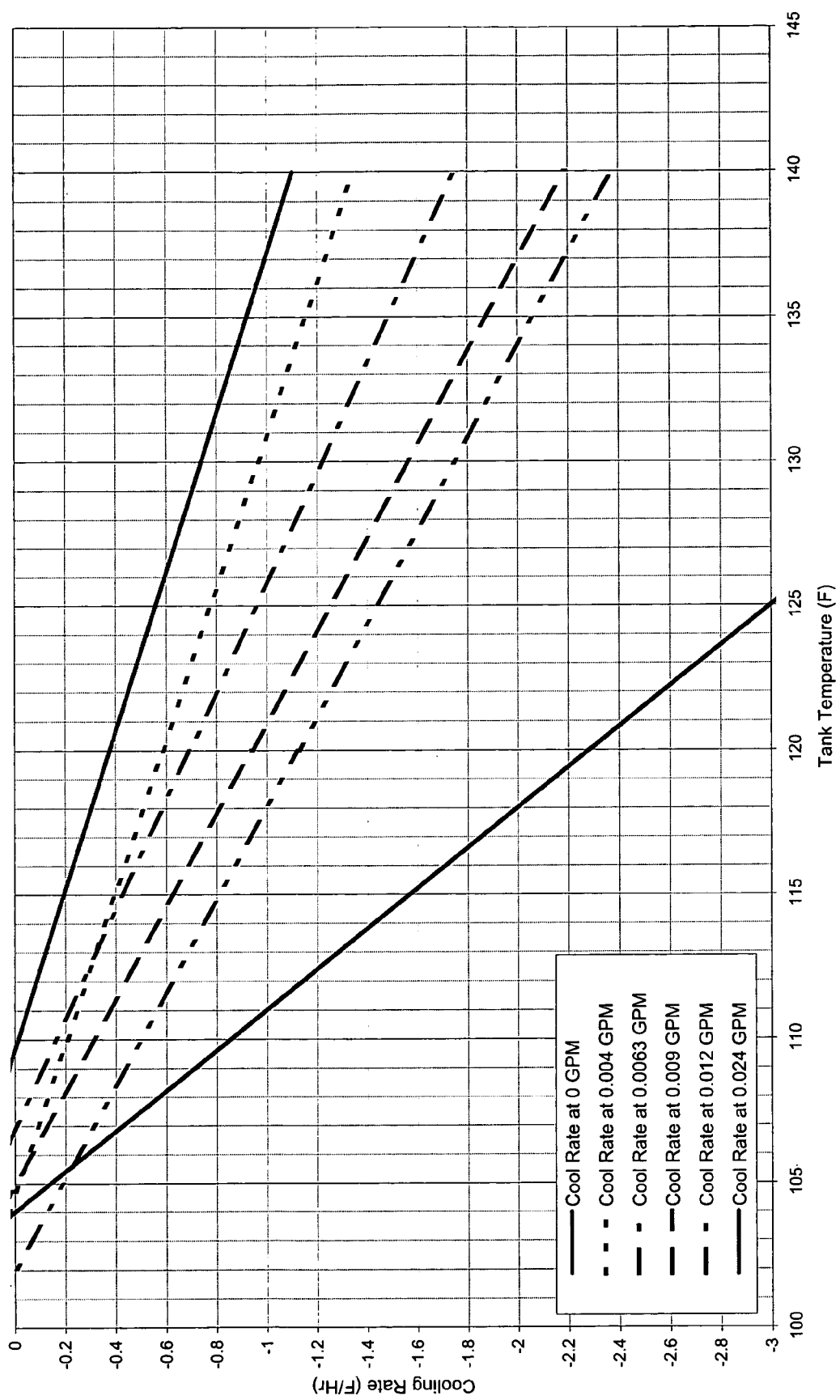
FIG. 6 is a chart of experimental data showing cooling rates versus tank temperature at various water draw rates for a gas water heater system having a 40 gallon tank in a 72° F. ambient temperature environment, with an intake water temperature of approximately 58.8° F.

FIG. 6 also illustrates the effect that a continuous and relatively small water draw has on the cooling rate of the system. For the data shown in FIG. 6, the temperature of the incoming water is about 58.8° F. For each of the trend lines shown, the horizontal axis offset and slope are indicative of the base temperature and the inverse negative of the cooling time constant, respectively. As a general trend, for any given tank temperature the cooling rate increases as the rate of the water draw increases. Additionally, the cooling time constant decreases, as indicated by an increase in slope magnitude. Because a leak is essentially a water draw, it is possible to monitor the water heater system for leaks by observing the cooling rate. As is shown by the data, for a given setup a water draw of slightly less than 0.01 gallons per minute results in a cooling rate that is approximately twice the rate for a water tank with no outflow. A water draw rate as small as 0.005 GPM produces a significant enough change in the cooling rate as to allow detection via this method, thereby allowing a high level of sensitivity in using this method for detecting leaks. As one can expect, the temperature of the incoming water will also affect the cooling rate when a leakage exists. However, if the temperature of the incoming water is available to the microcontroller, then it can be used to fine-adjust the cooling rate threshold for leakage detection. This can be accomplished by placing an additional temperature sensor (not shown) on the water intake pipe 104. Without this information, then the sensitivity window of leakage detection will be shifted. The end result in either case is that when the incoming water is cooler leakage will be easier to detect, and vice versa.

It is also worth noting that as the water draw increases, the upper to lower water temperature differential increases. As a result, it is possible to monitor the temperature differential for indications of a leak. However, the change in the temperature differential as a result of a water draw is not as pronounced as the change in the cooling rate of the system, making leak detection via this method less accurate.

3. Leak Detection Using Cooling Rate Observations

Figure 7:
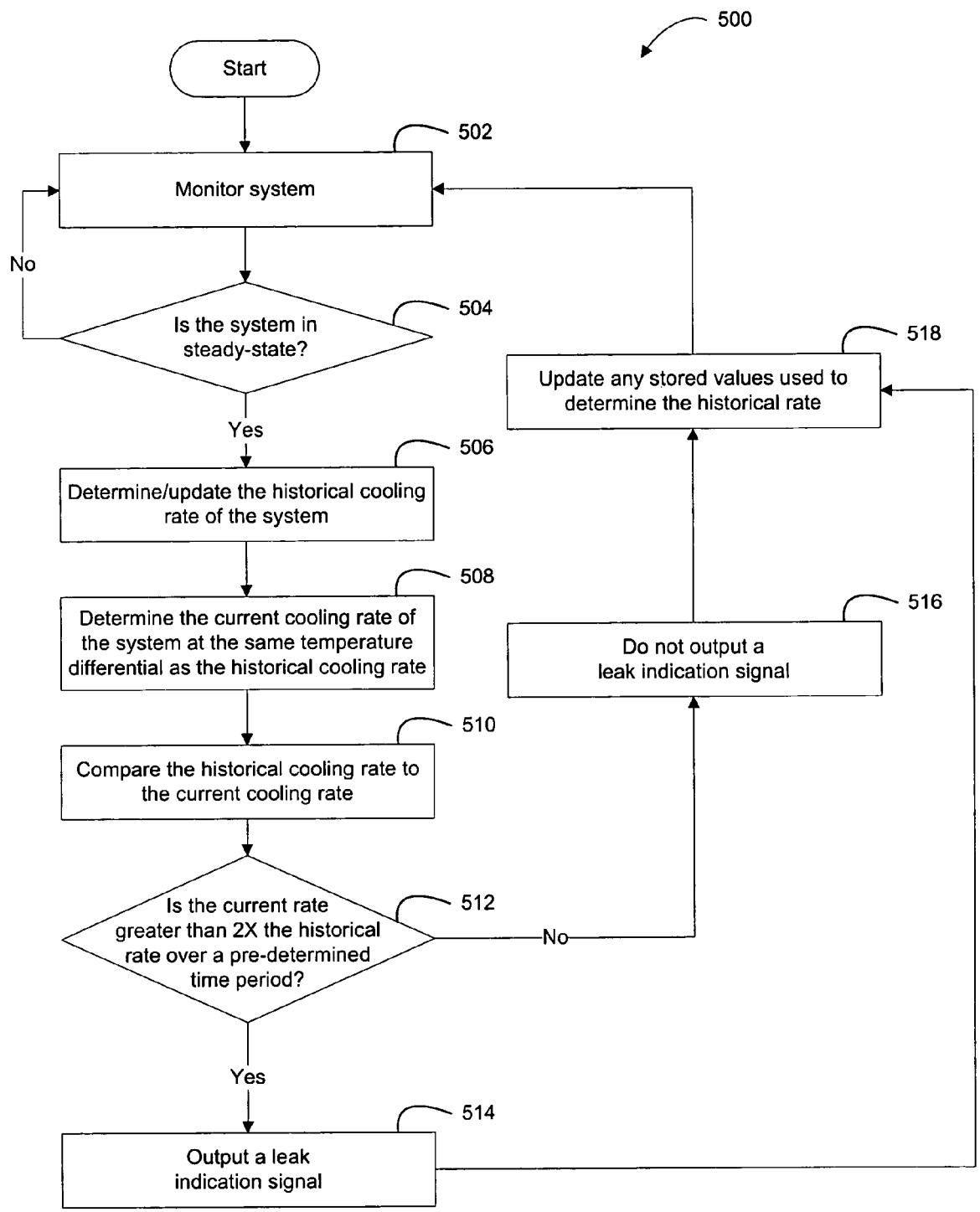
FIG. 7 is a process flow diagram illustrating a method for determining the presence of a leak based on changes in the cooling rate of the system.

FIG. 7 illustrates a method by which the natural cooling rate of the system can be used to identify the presence of a relatively small leak in the water heater system. Large leaks will be sensed as a normal water draw and will therefore not be detected as leakage. Before the system is evaluated for a leak, it is generally determined whether the system is undergoing steady-state cooling 504. Steady state cooling is defined as the condition that the heater is off, that there is no significant water draw, and that the temperature in the water tank is near uniform. For example, uniformity of the tank temperature may be determined as a temperature differential between the upper and lower sections of the tank that is less than 2° F. This ensures that any data gathered by the sensors during this period is relevant to the natural cooling rate of the system. After steady-state cooling has been established, the historical cooling rate of the system is determined and stored in memory 506. Next, the current cooling rate of the system at a given temperature is measured 508. This may be accomplished using data from the single temperature sensor 126 in the case of a single sensor system, or using data from the upper 127 and lower 128 temperature sensors in the case of a dual sensor system, or by measuring the rate directly through the controller 124. Using the processor in the control unit 124, the measured cooling rate at the given base temperature differential is then compared to the historical cooling rate at the same base temperature differential for the system 510. In the comparison, it is determined whether the measured value of the cooling rate is substantially different from that of the historical value 512. If there is a significant difference between the two values, the presence of a leak may be determined and the user may be notified 514; otherwise, the system will not generate a leak signal, which may involve canceling any currently active leak signal 516. In either case, the system may update any relevant stored values regarding cooling rate 518 and continue to monitor the system for leaks 502.

Figure 8:
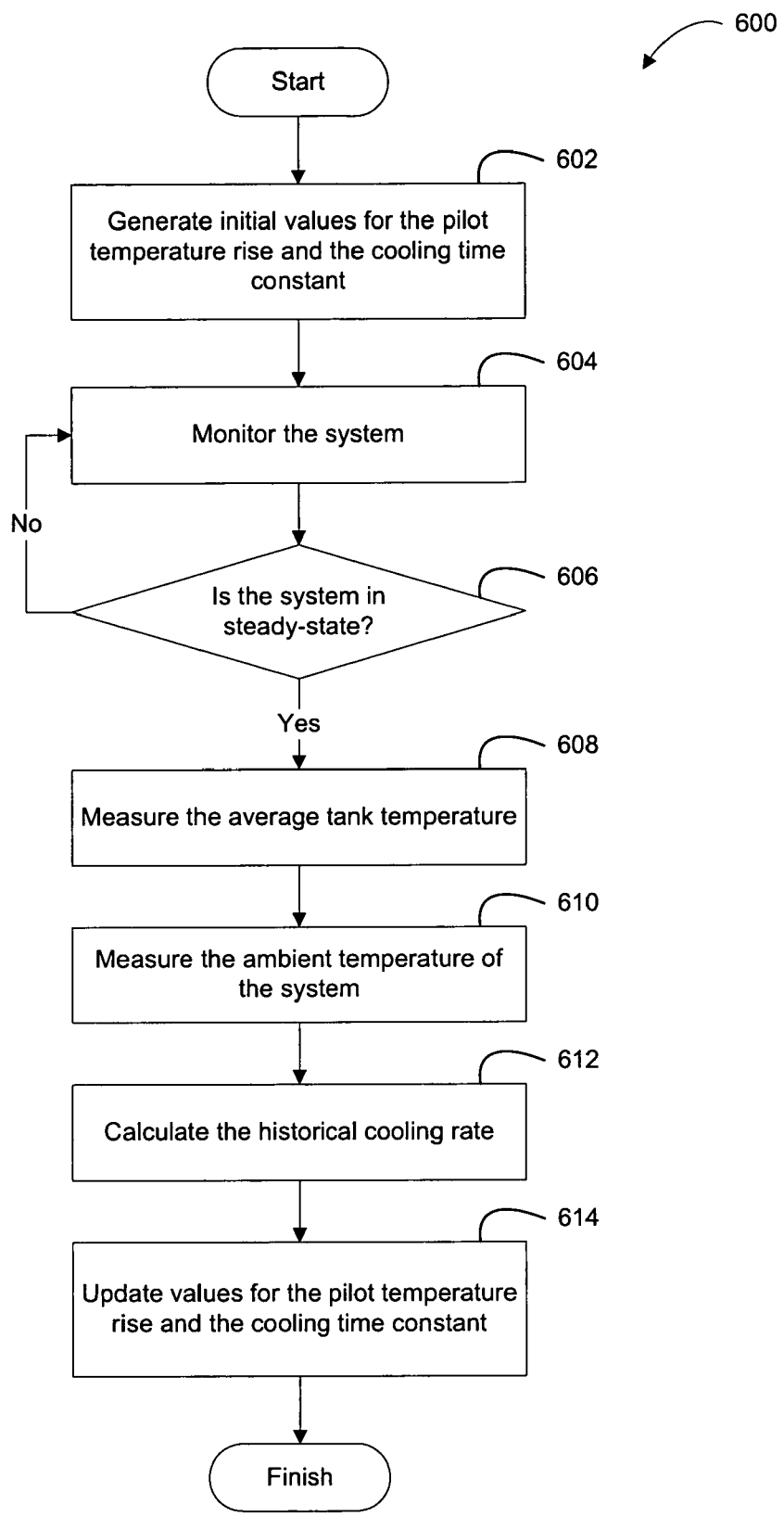
FIG. 8 is a process flow diagram illustrating a method for determining the historical cooling rate of a water heater unit with a storage tank.

One method for determining the historical cooling rate involves the indirect calculation of the cooling rate using both current temperature measurements and near-constant thermal parameters of the tank (FIG. 8). As stated above, the cooling rate of the system may be determined using the current temperature of the tank, the ambient temperature of the tank, the temperature rise caused by the pilot (in gas units), and the cooling time constant of the system. In this case, the current temperature of the tank and the ambient temperature of the system may vary greatly with the heating cycles of the system, while the temperature rise caused by the pilot and the cooling time constant both remain relatively stable. By keeping values of the temperature rise caused by the pilot and the cooling time constant stored in memory, a processor can calculate a historical cooling rate at any given water temperature 608 and ambient temperature combination 610. This calculation may be accomplished using equation (3) above 612. In this method, both the temperature rise and the cooling time constant would be slowly updated using a set algorithm.

In order to apply this method for determining the historical cooling rate of the system, initial values of the pilot temperature rise and cooling time constant are required 602. These values may be approximations that are initially stored in the controller memory prior to use, and based on experimental data. Alternatively, these initial values may be calculated using two sets of data measured by various system components. In this method an associated cooling rate, tank temperature, and ambient temperature are measured at one point in the cooling cycle. At a separate time and point in the cooling cycle, a second set of values for the cooling rate, tank temperature and ambient temperature are measured. Using equation (3), the following set of independent linear equations can be established to solve for the pilot temperature rise and the cooling time constant:

$$\begin{cases} C_1 = -\dfrac{T_{m1} - T_{a1} - T_p}{\tau} \\ C_2 = -\dfrac{T_{m2} - T_{a2} - T_p}{\tau} \end{cases} \quad (4)$$

where $C_1$, $T_{m1}$, and $T_{a1}$ are the first set of values for the cooling rate, tank temperature, and ambient temperature, respectively; $C_2$, $T_{m2}$, and $T_{n2}$ are the second set of values for the cooling rate, tank temperature, and ambient temperature, respectively; $T_p$ is the temperature rise caused by the pilot, and $\tau$ is the steady-state cooling time constant. Aside from calculating initial values 602, this method may also be used for periodically calculating current values of the pilot temperature rise and the cooling time constant 614, which may then be used to update stored values for these parameters.

As indicated above, the historical value of either the system cooling rate or the pilot temperature rise and cooling time constant may be updated according to a set algorithm stored in the processor of the control unit 124. This algorithm may incorporate the information from the newly measured values of the pilot temperature rise and cooling time constant into their respective stored historical values. For example, the algorithm may factor the current measured values into the historical stored values using a weighted average. This method should weight the measured data very lightly, so as to prevent the historical value from being corrupted by outlying or leak-affected cooling rates. For instance, the weight assigned to the newly measured value may be one hundredth of the recorded value. Alternatively, the weight assigned to the measured value may be higher or lower, in order to increase or decrease, respectively, the feedback of measurements into the stored value of the cooling rate. Conversely, the algorithm may also use another feedback process that incorporates measured values with previously stored values to form newly stored cooling time constant and pilot temperature rise values. By using a feedback method over the lifetime of the system, the historical values can be slowly fine-tuned and adjusted to account for various typical aging conditions that may affect the overall cooling rate of the system.

Once the historical cooling rate has been established, the current cooling rate can be determined for comparison. There are several water heater controllers and devices currently available that allow the cooling rate of a system to be constantly monitored. As a result, the cooling rate may be directly measured using the controller.

Figure 9:
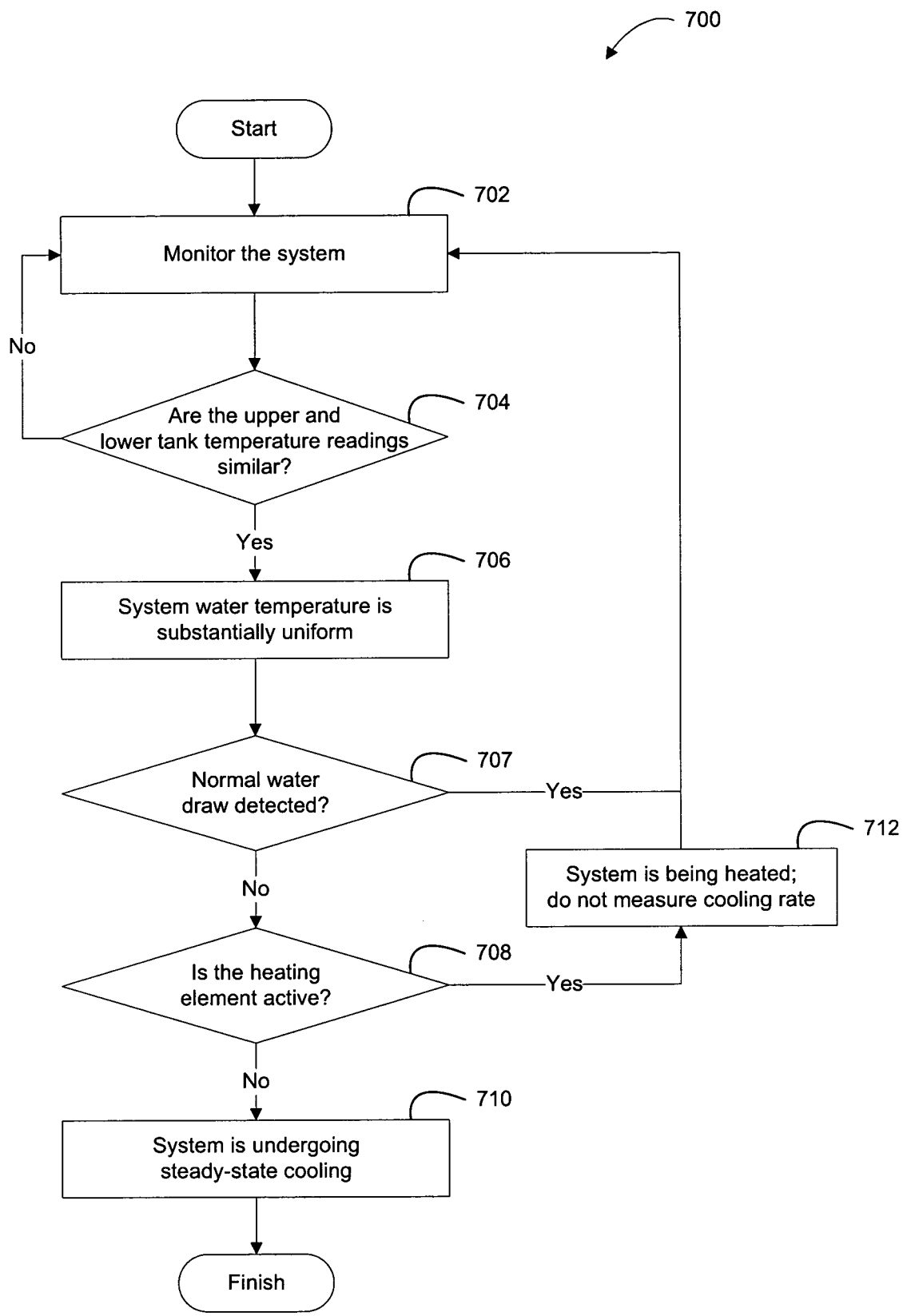
FIG. 9 is a process flow diagram illustrating a method for determining if the system is in a steady-state cooling phase.

However, in order to provide an accurate reading for the cooling rate, it must be sufficiently determined that the system is in a steady-state phase of the cooling cycle. For systems with two sensors, a method for determining when the system has reached this phase is shown in FIG. 9. Normally the water temperature near the bottom of the tank is equal to or lower than that near the top of the tank. During a water draw from the tank, cool water entering at the bottom of the tank will be at a much lower temperature than the heated temperature elsewhere in the tank. In this case, a substantial temperature differential between the upper and lower portions of the water storage tank is indicative of an external impetus that influences the overall cooling rate of the system. In order to provide a consistent and accurate value of the natural cooling rate of the system, the cooling rate should only be measured when the temperature of the water tank is substantially the same throughout the volume of the tank.

In order to determine if the temperature of the tank is the same 700, and therefore that the system is at a steady-state point in the heating and cooling cycle, a plurality of temperature sensors may be placed throughout the tank. Because the main differences in tank temperature arise between the upper and lower portions of the tank, it is prudent to place temperature sensors in the upper and lower sections of the tank. When the two temperature sensors provide substantially similar temperature readings 704, and it is known that a normal water draw is not taking place 707 and that the heating element is not active 708, it can reasonably be assumed that the system is undergoing steady-state cooling 710. It may be determined that a normal water draw is taking place if the cooling rate is currently greater than a given amount threshold, which may be, for example, 0.25° F./min. Once the system has been determined to be in steady state, a relatively accurate reading of the cooling rate can then be taken.

For a system with only a single sensor 126 in the lower part of the tank, the steady state can be determined based on the fact that when a significant temperature differential exists, the water in the upper part of the tank cools much faster than the water in the lower part of the tank. This trend continues until the water temperature of the upper and lower sections of the tank become substantially the same, at which point all of the water in the tank cools at the same rate. Therefore it is possible to monitor the lower temperature sensor 126 after a heating cycle when no water draw occurs in order to determine the status of the water in the tank. If the cooling rate changes from substantially none to a normal cooling rate (typically about 1.0 to 2.0° F./hour for a 40 g tank), then it can be reasonably determined that the water temperature has become substantially uniform.

Once the historical cooling rate and current cooling rate have been determined, it may be established whether the current cooling rate exceeds a threshold value in relation to the historical value 512. In the exemplary model shown in FIG. 7, this threshold is set at twice the historical value; alternatively, this threshold may be set lower to increase the sensitivity of the leak detection system, or it may be set higher in order to prevent the occurrence of false-alarms. If the current cooling rate does not exceed the threshold value, then it may be concluded that a leak is not present, and any data gathered during the process may be used to update stored historical values for the cooling rate or the pilot temperature rise and cooling time constant 518.

On the other hand, if the measured value for the cooling rate is found to be above the threshold value, it may be an indication that a leak has formed in the storage tank of the system 514. In this case, a leak signal is generated by the control unit 124 that can be used to alert the user to check the water heater system for a possible leak. The visual leak alarm 120 or its audible counterpart can be triggered by the leak signal. With the user having been alerted, it is then possible to make an inspection of the water heater to determine if a leak actually exists. If a leak is visually confirmed, the user can then take proper action in cutting off the supply of water to the system and fixing or replacing the water heater unit. Alternatively, the leak signal may activate an active leak alarm system that triggers an alert and can automatically close the water supply valve 105. If, after examination of the water heater system, a leak is not found, the system may be reset using a manual switch (not shown). After being reset, the system may move up the threshold level and resume monitoring the system for leaks 502.

Exemplary embodiments of the present invention relating to a leak detection system for a water heater having a storage tank have been illustrated and described. It should be noted that the figures are not drawn to scale and are approximations of one embodiment. Similarly, it should also be noted that more significant changes in configuration and form are also possible and intended to be within the scope of the system taught herein. For example, the invention may be used in conjunction with an electric water heater system as opposed to a gas water heater system, or with a single or multiple tank temperature sensors. It will be understood that variations in form and detail may be made to the invention without deviating from the spirit and scope of the invention, as defined by the following claims.

We claim:

1. A method for detecting a leak in a storage tank of a water heating system, the method comprising:
   determining a historical cooling rate of the storage tank;
   determining a current cooling rate of the storage tank;
   comparing the historical cooling rate of the storage tank to the current cooling rate; and
   determining that a leak is present if the current cooling rate is substantially different from the historical cooling rate.

2. The method for detecting a leak of claim 1 wherein the historical cooling rate of the system is determined directly by reading a value stored in a memory.

3. The method for detecting a leak of claim 1 wherein the water heating unit is a gas unit and includes a heating pilot.

4. The method for detecting a leak of claim 3 wherein the historical cooling rate of the storage tank is calculated using the following process:
   measuring an average temperature of water in the storage tank in steady-state;
   measuring an ambient temperature of an environment surrounding the storage tank;
   determining a temperature rise caused by the pilot;
   determining a steady-state cooling time constant; and
   calculating the historical cooling rate of the storage tank using the following equation:

$$C_h = -\frac{T_m - T_a - T_p}{\tau}$$

where $C_h$ is the historical cooling rate at a given base temperature differential, $T_m$ is the average temperature of the water in the storage tank in steady-state, $T_a$ is the ambient temperature, $T_p$ is a temperature rise caused by the pilot, and $\tau$ is a steady-state cooling time constant.

5. The method for detecting a leak of claim 4 wherein the temperature rise caused by the pilot and the steady-state cooling time constant are determined using the following process:
   measuring a first cooling rate, a first average temperature of the storage tank water, and a first ambient temperature of the system;
   measuring a second cooling rate, a second average temperature of the storage tank water, and a second ambient temperature of the system; and
   calculating the temperature rise caused by the heating pilot and the steady-state cooling time constant by solving the following pair of linearly independent equations:

$$\begin{cases} C_1 = -\dfrac{T_{m1} - T_{a1} - T_p}{\tau} \\ C_2 = -\dfrac{T_{m2} - T_{a2} - T_p}{\tau} \end{cases}$$

where $C_1$ is the first cooling rate, $T_{m1}$ is the first average temperature of the storage tank water, $T_{a1}$ is the first ambient temperature, $C_2$ is the second cooling rate, $T_{m2}$ is the second average temperature of the storage tank water, $T_{a2}$ is the second ambient temperature, $T_p$ is the temperature rise caused by the pilot, and $\tau$ is the steady-state cooling time constant.

6. The method for detecting a leak of claim 4 wherein the temperature rise caused by the pilot and the steady-state cooling time constant are stored in memory.

7. The method for detecting a leak of claim 6 wherein stored values for the temperature rise caused by the pilot and the steady-state cooling time constant are periodically updated using current measurements of cooling rate, ambient temperature, and storage tank water temperature.

8. The method for detecting a leak of claim 7 wherein the stored values for the temperature rise caused by the pilot and the steady-state cooling time constant are updated using a weighted average feedback method.

9. The method for detecting a leak of claim 8 wherein the weighted average feedback method comprises the following process:
   calculating current values for the temperature rise caused by the pilot and the cooling time constant;
   averaging the current values for the temperature rise caused by the pilot and the cooling time constant with their respective stored values to create respective updated values, where the current values receive a smaller averaging weight than the stored values; and
   replacing the stored values with the updated values for the temperature rise caused by the pilot and the cooling time constant.

10. The method for detecting a leak of claim 1 wherein the current cooling rate of the storage tank is determined directly using a measurement of the cooling rate of the system.

11. The method for detecting a leak of claim 10 further comprising determining if the system is in steady state prior to measuring the cooling rate of the storage tank.

12. The method for detecting a leak of claim 11 wherein determining if the system is in steady state is accomplished using the following process:
   monitoring the temperature of water in the storage tank at a first location to determine a cooling rate of the water at the first location; and
   determining that the system is in steady state if the cooling rate of the water at the first location changes from substantially none to a substantially normal cooling rate.

13. The method for detecting a leak of claim 12 wherein the normal cooling rate is about 1.0 to about 2.0° F./hour.

14. The method for detecting a leak of claim 11 wherein determining if the system is in steady state is accomplished using the following process:
   taking a first temperature reading of the storage tank at a first location;
   taking a second temperature reading of the storage tank at a second location; and
   determining if the water heater system is at a steady state by comparing the first temperature reading and the second temperature reading.

15. The method for detecting a leak of claim 14 wherein the first location is near the top of the storage tank and the second location is near the bottom of the storage tank.

16. The method for detecting a leak of claim 15 wherein the water heater system is determined to be at a steady state if the first temperature reading and the temperature reading are substantially equal.

17. The method for detecting a leak of claim 1 wherein the presence of a leak is determined if the current cooling rate of a given base temperature differential is substantially greater than the historical cooling rate at the same base temperature differential.

18. The method for detecting a leak of claim 17 wherein the presence of a leak is determined if the current cooling rate is greater than about twice the historical cooling rate.

19. A leak detection system for detecting a leak in a water heater unit, the system comprising:
   a water storage tank;
   a first water tank temperature sensor that measures a first temperature of the water storage tank at a first location;
   a second water tank temperature sensor that measures a second temperature of the water storage tank at a second location;
   an external temperature sensor;
   a memory;
   a controller that measures a current cooling rate of the system;
   a processor;
   a first set of instructions stored in the memory and executable by the processor for calculating a value for a cooling time constant and storing the value in memory;
   a second set of instructions stored in the memory and executable by the processor for calculating a value of a historical cooling rate of the system using the cooling time constant, and input from the external temperature sensor, the first water tank temperature sensor, and the second water tank temperature sensor;
   a third set of instructions stored in the memory and executable by the processor for determining if a leak is present and outputting a leak indication signal using the historical cooling rate of the system and the current cooling rate of the system as inputs; and
   at least one stored value in the memory of the cooling time constant of the water heater unit.

20. The leak detection system of claim 19 further comprising:
   a gas heating element with a pilot;
   a fourth set of instructions stored in the memory and executable by the processor for calculating a value for temperature rise caused by the pilot and storing the value in memory; and
   at least one stored value in the memory of the temperature rise caused by the pilot, wherein the set of instructions stored for calculating the value for the historical cooling rate of the system also uses the temperature rise caused by the pilot.

21. The leak detection system of claim 20 where the historical cooling rate of the storage tank is calculated using the following equation:

$$C_h = \frac{T_m - T_a - T_p}{\tau}$$

where $C_h$ is the historical cooling rate, $T_m$ is an average temperature of the water in the storage tank measured by the first tank water temperature sensor and the second tank water temperature sensor, $T_a$ is an ambient temperature measured by the external temperature sensor, $T_p$ is the temperature rise caused by the pilot, and $\tau$ is the steady-state cooling time constant.

22. The system of claim 20 wherein the cooling time constant and the temperature rise caused by the pilot are calculated using the following two sets of values:
   a first set of values comprising a first average temperature of the storage tank water measured by the first and second water tank temperature sensors, a first cooling rate measured by the processor, and a first ambient temperature measured by the external temperature sensor; and
   a second set of values comprising a second average temperature of the storage tank water measured by the first and second water tank temperature sensors, a second cooling rate measure by the processor, and a second ambient temperature measured by the external temperature sensor.

23. The system of claim 22 wherein the cooling time constant and the temperature rise caused by the pilot are calculated using the following pair of linearly independent equations:

$$\begin{cases} C_1 = -\dfrac{T_{m1} - T_{a1} - T_p}{\tau} \\ C_2 = -\dfrac{T_{m2} - T_{a2} - T_p}{\tau} \end{cases}$$

where $C_1$ is the first cooling rate, $T_{m1}$ is the first average temperature of the storage tank water, $T_{a1}$ is the first ambient temperature, $C_2$ is the second cooling rate, $T_{m2}$ is the second average temperature of the storage tank water, $T_{a2}$ is the second ambient temperature, $T_p$ is the temperature rise caused by the pilot, and $\tau$ is the steady-state cooling time constant.

24. The system of claim 19 further comprising a visual alarm indicator that receives a leak indication signal from the processor.

25. The system of claim 19 further comprising an aural alarm indicator that receives a leak indication signal from the processor.

26. A leak detection system for detecting a leak in a gas water heater unit, the system comprising:
   a water storage tank;
   a first water tank temperature sensor that measures a first temperature of the water storage tank at a first location;
   a second water tank temperature sensor that measures a second temperature of the water storage tank at a second location;
   an external temperature sensor;
   a pilot;
   a memory;
   a controller that measures a current cooling rate of the system;
   a processor;
   a first set of instructions stored in the memory and executable by the processor for calculating a value for a temperature rise caused by the pilot and a value for a cooling time constant, and storing both values in memory;
   a second set of instructions stored in the memory and executable by the processor for calculating a value of a historical cooling rate of the system using the temperature rise caused by the pilot, the cooling time constant, and input from the external temperature sensor, the first water tank temperature sensor, and the second water tank temperature sensor;
   a third set of instructions stored in the memory and executable by the processor for determining if a leak is present and outputting a leak indication signal using the historical cooling rate of the system and the current cooling rate of the system as inputs;
   at least one stored value in the memory of the temperature rise caused by the pilot; and
   at least one stored value in the memory of the cooling time constant of the water heater unit.

* * * * *